United States Patent
Kwok et al.

(10) Patent No.: US 9,442,648 B2
(45) Date of Patent: Sep. 13, 2016

(54) PORTABLE ELECTRONIC DEVICE AND METHOD OF CONTROLLING SAME

(75) Inventors: Jordanna Kwok, Waterloo (CA); Ronald Scotte Zinn, Waterloo (CA); Qian Amanda Yang, Waterloo (CA); Michael George Langlois, Kanata (CA); Raymond Lee Canton, Kanata (CA)

(73) Assignee: BlackBerry Limited, Waterloo (CA)

( * ) Notice: Subject to any disclaimer, the term of this patent is extended or adjusted under 35 U.S.C. 154(b) by 1811 days.

(21) Appl. No.: 12/575,248

(22) Filed: Oct. 7, 2009

(65) Prior Publication Data

US 2010/0171713 A1 Jul. 8, 2010

Related U.S. Application Data

(63) Continuation-in-part of application No. 12/246,836, filed on Oct. 7, 2008.

(51) Int. Cl.
*G06F 3/048* (2013.01)
*G06F 3/0488* (2013.01)

(52) U.S. Cl.
CPC ........ *G06F 3/0488* (2013.01); *H04M 2250/22* (2013.01)

(58) Field of Classification Search
None
See application file for complete search history.

(56) References Cited

U.S. PATENT DOCUMENTS

| | | | | |
|---|---|---|---|---|
| 6,154,214 A * | 11/2000 | Uyehara | ............... | G06F 1/1626 715/835 |
| 6,181,344 B1 * | 1/2001 | Tarpenning | ........... | G06F 1/1626 715/825 |
| 7,489,306 B2 | 2/2009 | Kolmykov-Zotov et al. | | |
| 7,605,804 B2 | 10/2009 | Wilson | | |
| 7,864,161 B2 * | 1/2011 | Hollemans et al. | .......... | 345/173 |
| 7,936,341 B2 * | 5/2011 | Weiss | ............................ | 345/173 |
| 2003/0156137 A1 | 8/2003 | Von Essen et al. | | |
| 2004/0021644 A1 | 2/2004 | Enomoto | | |
| 2005/0076300 A1 * | 4/2005 | Martinez | ................. | G06F 17/24 715/272 |
| 2006/0001650 A1 | 1/2006 | Robbins et al. | | |
| 2006/0005151 A1 | 1/2006 | Altman | | |
| 2006/0197753 A1 | 9/2006 | Hotelling | | |
| 2006/0244735 A1 | 11/2006 | Wilson | | |
| 2007/0115264 A1 | 5/2007 | Yu et al. | | |
| 2007/0252821 A1 | 11/2007 | Hollemans et al. | | |
| 2008/0098331 A1 | 4/2008 | Novick et al. | | |

(Continued)

FOREIGN PATENT DOCUMENTS

| CN | 1504950 A | 6/2004 |
|---|---|---|
| CN | 1620642 A | 5/2005 |

(Continued)

OTHER PUBLICATIONS

International Patent Application No. PCT/CA2009/001421, International Search Report dated Dec. 29, 2009.

(Continued)

*Primary Examiner* — William Bashore
*Assistant Examiner* — Henry Orr
(74) *Attorney, Agent, or Firm* — Borden Ladner Gervais LLP; Geoffrey deKleine (57) ABSTRACT

A method includes displaying information on a touch-sensitive display, detecting a touch at location associated with the information, rendering an indicator and a cursor at a position within the information, detecting a moving touch associated with the indicator, and moving the cursor along the information as the indicator is moved.

11 Claims, 6 Drawing Sheets

(56) References Cited

U.S. PATENT DOCUMENTS

| | | | |
|---|---|---|---|
| 2008/0165145 A1 | 7/2008 | Herz et al. | |
| 2008/0174570 A1* | 7/2008 | Jobs .................. | G06F 3/0488 345/173 |
| 2008/0259040 A1* | 10/2008 | Ording ............... | G06F 3/04886 345/173 |
| 2008/0297482 A1* | 12/2008 | Weiss ................. | G06F 3/04883 345/173 |
| 2009/0225042 A1* | 9/2009 | Andrews ............ | G06F 3/04883 345/173 |
| 2009/0228792 A1 | 9/2009 | Van Os et al. | |
| 2009/0228842 A1 | 9/2009 | Westerman et al. | |

FOREIGN PATENT DOCUMENTS

| | | |
|---|---|---|
| CN | 101068411 A | 11/2007 |
| CN | 101809532 A | 8/2010 |
| EP | 0419145 | 3/1991 |
| EP | 0622722 | 11/1994 |
| EP | 1840717 | 10/2007 |
| EP | 2098947 A2 | 9/2009 |
| GB | 2352156 | 1/2001 |
| JP | 05-282099 | 10/1993 |
| JP | 08-123600 | 5/1996 |
| JP | 2004-086621 | 3/2004 |
| JP | 2005-092472 | 4/2005 |
| JP | 2007-272904 | 10/2007 |
| WO | 2007057266 | 5/2007 |

OTHER PUBLICATIONS www.theiphoneblog.com/2009/03/23/preview-iphone-os-30-beta-software-walkthrough/, retrieved on Mar. 23, 2009.

www.pencomputing.com/reviews/apple_iphone-quickoffice.html, published at least as early as Dec. 22, 2009.

European Patent Application No. 08166049.0, Search Report dated Feb. 9, 2009.

Anirudh, "Google SoC multitouch ebook application proposal", Internet Article, Apr. 9, 2008, XPXP007910846, retrieved from the internet: URL:http//nuigroup.com/forums/viewthread/1629 (retrieved on Dec. 9, 2009).

Esler, "Copy and Paste on the iPhone", Internet Article Jul. 5, 2008, XPXP007910847, retrieved from the Internet: URL: http://www.dearcupertino.com/2008/07/copy-and-paste-on-iphone.html (retrieved on Dec. 9, 2009).

European Patent Application No. 08166049.0, Search Report dated Dec. 15, 2009.

Office Action dated Oct. 26, 2012, issued in respect of corresponding Japanese Patent Application No. 2011-529432.

Office Action dated Nov. 28, 2014, issued in respect of corresponding Chinese Patent Application No. 200980139718.6 (English translation not available).

Extended European Search Report dated Feb. 8, 2016, issued in respect of corresponding EP Application No. 09818714.9.

Chinese Office Action dated Feb. 18, 2013, issued against corresponding Chinese patent application No. 200980139718.6.

Japanese Office Action dated Feb. 22, 2013, issued against corresponding Japanese patent application No. 2011-529432.

Canadian Examiner's Report dated Mar. 15, 2013, issued against corresponding Canadian patent application No. 2,738,698.

Office Action dated May 6, 2014, issued in respect of corresponding Chinese Patent Application No. 200980139718.6 (English translation not available).

Korean Office Action dated Jun. 27, 2013 against corresponding Korean Patent Application No. 10-2011-7009892.

English translation of Office Action dated Oct. 22, 2013, issued in respect of corresponding Chinese Patent Application No. 200980139718.6.

\* cited by examiner

PORTABLE ELECTRONIC DEVICE AND METHOD OF CONTROLLING SAME

CROSS-REFERENCE TO RELATED APPLICATIONS

This application is a continuation-in-part of prior U.S. patent application Ser. No. 12/246,836, filed Oct. 7, 2008, the entire content of which is incorporated herein by reference.

FIELD OF TECHNOLOGY

The present disclosure relates to electronic devices, including but not limited to portable electronic devices including touch-sensitive displays.

BACKGROUND

Electronic devices, including portable electronic devices, have gained widespread use and may provide a variety of functions including, for example, telephonic, electronic messaging and other personal information manager (PIM) application functions. Portable electronic devices include several types of devices including mobile stations such as simple cellular telephones, smart telephones, wireless PDAs, and laptop computers with wireless 802.11 or Bluetooth capabilities.

Portable electronic devices such as PDAs or smart telephones are generally intended for handheld use and ease of portability. Smaller devices are generally desirable for portability. A touch-sensitive display, also known as a touch-screen display, is particularly useful on handheld devices, which are small and have limited space for user input and output. The information displayed on the touch-sensitive displays may be modified depending on the functions and operations being performed.

Improvements in devices with touch-sensitive displays are desirable.

DETAILED DESCRIPTION

The following describes a portable electronic device for and a method of detecting a first touch on a touch-sensitive display, rendering an indicator associated with a marker rendered on the touch-sensitive display; and moving the marker when the indicator is moved, for example, by a touching that begins at a location associated with the indicator and moves along the touch-sensitive display.

For simplicity and clarity of illustration, reference numerals may be repeated among the figures to indicate corresponding or analogous elements. Numerous details are set forth to provide an understanding of the embodiments described herein. The embodiments may be practiced without these details. In other instances, well-known methods, procedures, and components have not been described in detail to avoid obscuring the embodiments described. The description is not to be considered as limited to the scope of the embodiments described herein.

The disclosure generally relates to an electronic device, which is a portable electronic device in the embodiments described herein. Examples of portable electronic devices include mobile, or handheld, wireless communication devices such as pagers, cellular phones, cellular smartphones, wireless organizers, personal digital assistants, wirelessly enabled notebook computers, and so forth. The portable electronic device may also be a portable electronic device without wireless communication capabilities, such as a handheld electronic game device, digital photograph album, digital camera, or other device.

Figure 1:
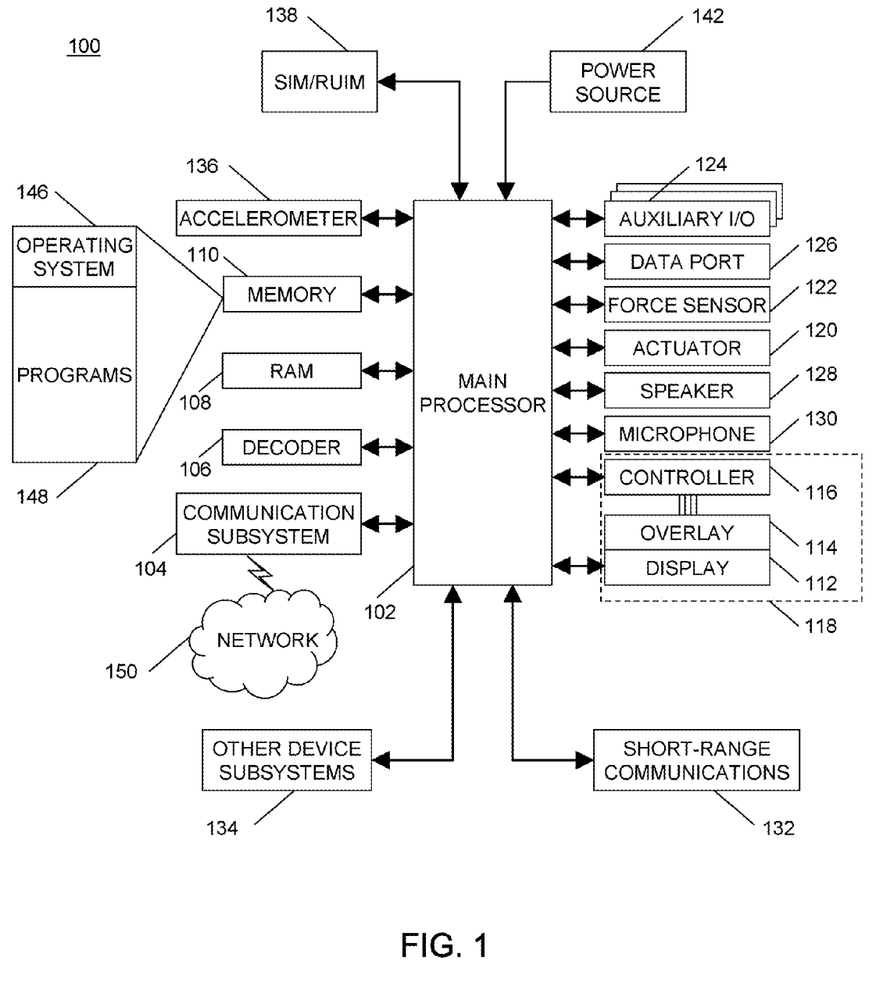
FIG. 1 is a block diagram of a portable electronic device in accordance with the present disclosure.

A block diagram of an example of a portable electronic device 100 is shown in FIG. 1. The portable electronic device 100 includes multiple components, such as a processor 102 that controls the overall operation of the portable electronic device 100. Communication functions, including data and voice communications, are performed through a communication subsystem 104. Data received by the portable electronic device 100 is decompressed and decrypted by a decoder 106. The communication subsystem 104 receives messages from and sends messages to a wireless network 150. The wireless network 150 may be any type of wireless network, including, but not limited to, data wireless networks, voice wireless networks, and networks that support both voice and data communications. A power source 142, such as one or more rechargeable batteries or a port to an external power supply, powers the portable electronic device 100.

The processor 102 interacts with other components, such as Random Access Memory (RAM) 108, memory 110, a display 112 with a touch-sensitive overlay 114 operably connected to an electronic controller 116 that together comprise a touch-sensitive display 118, one or more actuators 120, one or more force sensors 122, an auxiliary input/output (I/O) subsystem 124, a data port 126, a speaker 128, a microphone 130, short-range communications 132, and other device subsystems 134. User-interaction with a graphical user interface is performed through the touch-sensitive overlay 114. The processor 102 interacts with the touch-sensitive overlay 114 via the electronic controller 116. Information, such as text, characters, symbols, images, icons, and other items that may be displayed or rendered on a portable electronic device, is displayed on the touch-sensitive display 118 via the processor 102. The processor 102 may interact with an accelerometer 136 that may be utilized to detect direction of gravitational forces or gravity-induced reaction forces.

To identify a subscriber for network access, the portable electronic device 100 uses a Subscriber Identity Module or a Removable User Identity Module (SIM/RUIM) card 138 for communication with a network, such as the wireless network 150. Alternatively, user identification information may be programmed into memory 110.

The portable electronic device 100 includes an operating system 146 and software programs or components 148 that are executed by the processor 102 and are typically stored in a persistent, updatable store such as the memory 110. Additional applications or programs may be loaded onto the portable electronic device 100 through the wireless network 150, the auxiliary I/O subsystem 124, the data port 126, the short-range communications subsystem 132, or any other suitable subsystem 134.

A received signal such as a text message, an e-mail message, or web page download is processed by the communication subsystem 104 and input to the processor 102. The processor 102 processes the received signal for output to the display 112 and/or to the auxiliary I/O subsystem 124. A subscriber may generate data items, for example e-mail messages, which may be transmitted over the wireless network 150 through the communication subsystem 104. For voice communications, the overall operation of the portable electronic device 100 is similar. The speaker 128 outputs audible information converted from electrical signals, and the microphone 130 converts audible information into electrical signals for processing.

The touch-sensitive display 118 may be any suitable touch-sensitive display, such as a capacitive, resistive, infrared, surface acoustic wave (SAW) touch-sensitive display, strain gauge, optical imaging, dispersive signal technology, acoustic pulse recognition, and so forth, as known in the art. A capacitive touch-sensitive display includes a capacitive touch-sensitive overlay 114. The overlay 114 may be an assembly of multiple layers in a stack including, for example, a substrate, a ground shield layer, a barrier layer, one or more capacitive touch sensor layers separated by a substrate or other barrier, and a cover. The capacitive touch sensor layers may be any suitable material, such as patterned indium tin oxide (ITO).

One or more touches, also known as touch contacts or touch events, may be detected by the touch-sensitive display 118. The processor 102 may determine attributes of the touch, including a location of a touch. Touch location data may include an area of contact or a single point of contact, such as a point at or near a center of the area of contact. The location of a detected touch may include x and y components, e.g., horizontal and vertical components, respectively, with respect to one's view of the touch-sensitive display 118. For example, the x location component may be determined by a signal generated from one touch sensor, and the y location component may be determined by a signal generated from another touch sensor. A signal is provided to the controller 116 in response to detection of a touch. A touch may be detected from any suitable object, such as a finger, thumb, appendage, or other items, for example, a stylus, pen, or other pointer, depending on the nature of the touch-sensitive display 118. Multiple simultaneous touches may be detected.

The actuator(s) 120 may be depressed by applying sufficient force to the touch-sensitive display 118 to overcome the actuation force of the actuator 120. The actuator 120 may be actuated by pressing anywhere on the touch-sensitive display 118. The actuator 120 may provide input to the processor 102 when actuated. Actuation of the actuator 120 may result in provision of tactile feedback. When force is applied, the touch-sensitive display 118 is depressible, pivotable, and/or movable.

A mechanical dome switch actuator may be utilized. In this example, tactile feedback is provided when the dome collapses due to imparted force and when the dome returns to the rest position after release of the switch.

Alternatively, the actuator 120 may comprise one or more piezoelectric (piezo) devices that provide tactile feedback for the touch-sensitive display 118. Contraction of the piezo actuator(s) applies a spring-like force, for example, opposing a force externally applied to the touch-sensitive display 118. Each piezo actuator includes a piezoelectric device, such as a piezoelectric ceramic disk adhered to a metal substrate. The metal substrate bends when the piezo disk contracts due to build up of charge at the piezo disk or in response to a force, such as an external force applied to the touch-sensitive display 118. The charge may be adjusted by varying the applied voltage or current, thereby controlling the force applied by the piezo disks. The charge on the piezo actuator may be removed by a controlled discharge current that causes the piezo disk to expand, releasing the force thereby decreasing the force applied by the piezo disks. The charge may advantageously be removed over a relatively short period of time to provide tactile feedback to the user. Absent an external force and absent a charge on the piezo disk, the piezo disk may be slightly bent due to a mechanical preload.

Figure 2:
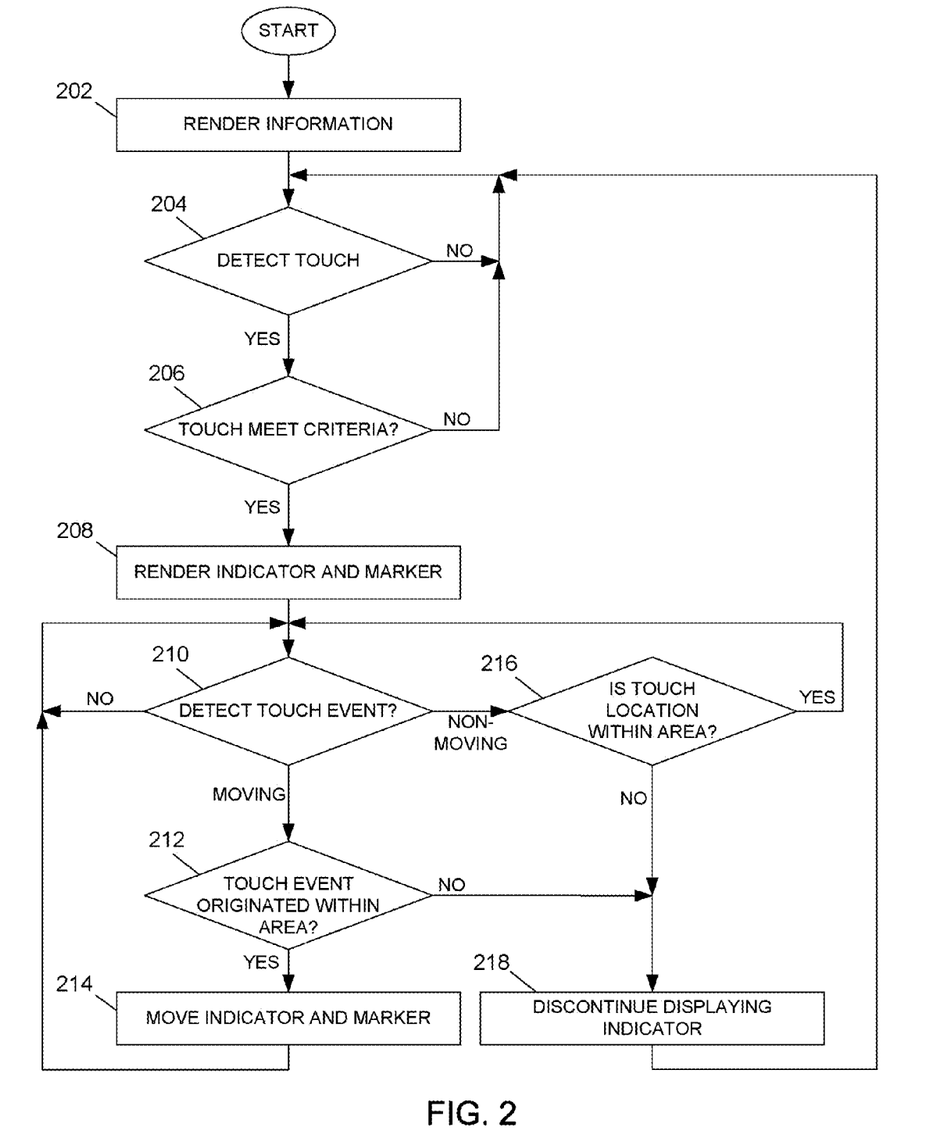
FIG. 2 is a flowchart illustrating a method of controlling cursor location on a touch-sensitive display in accordance with the present disclosure.

A flowchart illustrating a method of controlling cursor location on a touch-sensitive display is shown in FIG. 2. The method may be carried out by software executed by, for example, the processor 102. Coding of software for carrying out such a method is within the scope of a person of ordinary skill in the art given the present description.

Figure 3:
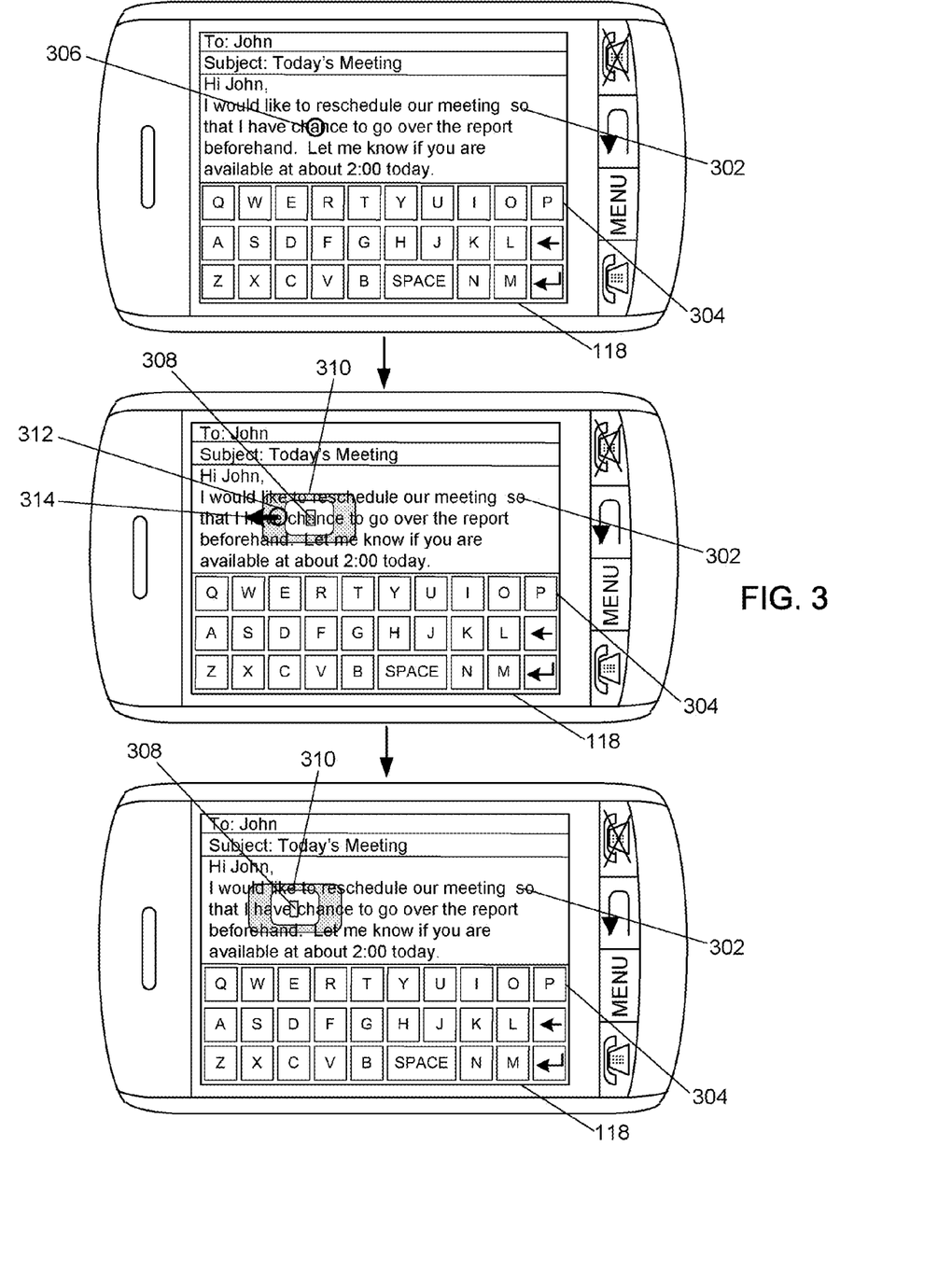
FIG. 3 Illustrates examples of cursor location control for a touch-sensitive display of a portable electronic in accordance with the present disclosure.

Information, such as text, is rendered 202 on the touch-sensitive display 118, for example, for an application such as an electronic mail, calendar, address book, web browser, or other suitable application. The rendered information may also include a plurality of keys of a keyboard, for example. When a touch is detected 204 at a location associated with the information, by the touch-sensitive display 118, if the touch meets 206 one or more criteria, an indicator and a marker, if not already displayed, are rendered 208 at a location associated with the information. The criteria include, for example, a touch that exceeds a force threshold, such as one that depresses the touch sensitive display. In this situation, the marker is rendered at the location of the touch. The criteria may also include a single or multiple touch, also known as a tap, at a location within an area associated with the indicator. The multiple touch may be located at an area outside the area associated with the indicator. The indicator is advantageously larger in size than the marker, such as shown in FIG. 3, to facilitate easier handling and maneuvering by a contact member such as a finger. The indicator may partially or fully surround the marker, and the area associated with the indicator is near or adjacent to the marker. The marker, which may be rendered prior detection of the touch at 204, may be rendered at the location of the touch or at the previous or default location, such as the previous or default location of a cursor. The marker may include a cursor, blinking bar, highlighted box, caret, and/or any other suitable marker. The marker identifies a position or location within the information, such as a character of displayed text. When a moving touch event is detected 210 by the touch-sensitive display 118, a determination is made 212 as to whether the moving touch event originated within the area associated with the indicator. When the moving touch event originates 212 at a location within the area associated with the indicator, the marker and the indicator move 214 along the information as the touch moves. Thus, when a touch that originates at a location within the area of the indicator moves, the marker, e.g., cursor, moves wherever the touch moves until the touch ends, for example, when contact with the touch-sensitive display 118 ceases to be detected, when the touch-sensitive display 118 is depressed, and so forth. While the marker is displayed, the information may be edited, e.g., by inserting information, deleting information, and so forth. When a non-moving touch is detected 216 that is not at a location associated with the area of the indicator, or when a moving touch is detected 212 that is not at a location associated with the area of the indicator, the touch-sensitive display 118 discontinues display 218 of the indicator, and the process continues at 204.

Examples of cursor location control for a touch-sensitive display 118 of a portable electronic device 100 are shown in the series of illustrations of FIG. 3. Information in the form of text 302 is rendered 202 on the touch-sensitive display 118 in fields of an email in this example. A plurality of keys of a keyboard 304 are also rendered on the touch-sensitive display 118. A touch that depressed the touch-sensitive display 118 at a location 306 within the text is shown in the upper illustration of FIG. 3, and a marker 308 and an indicator 310 are rendered at the location 306 in the middle illustration of FIG. 3. The marker 308 is a highlighted rectangle and the indicator 310 is shown generally rectangular and surrounding the marker 308. The outer periphery of the indicator is shaded and the area between the indicator 310 and the marker 308 is not shaded, for example to form a window for viewing the text. Thus, the attributes of the indicator 310 and the information facilitate viewing of the marker 308 and the information when the indicator 310 is displayed. The larger size of the indicator facilitates selection by touching at a location within an area associated with the indicator 310. Movement of the touch that originated at the location 306 within the area of the indicator 310 is illustrated by the arrow 314 in the middle illustration of FIG. 3. The marker 308 and the indicator 310 are moved from the "a" in "chance" to a new location, the space between "have" and "chance" as shown in the lower illustration of FIG. 3. In this example, the marker 308 acts as a cursor, and "a" may be entered via the touch-sensitive display to change "have chance" to "have a chance" in the text. The indicator 310 operates in conjunction with the marker 308 to function, in effect, as an enlarged cursor that has a wider and/or taller effective area that facilitates easier and more accurate control and manipulation within the information. Various different sizes and/or shapes of the indicators may be successfully utilized.

Figure 4:
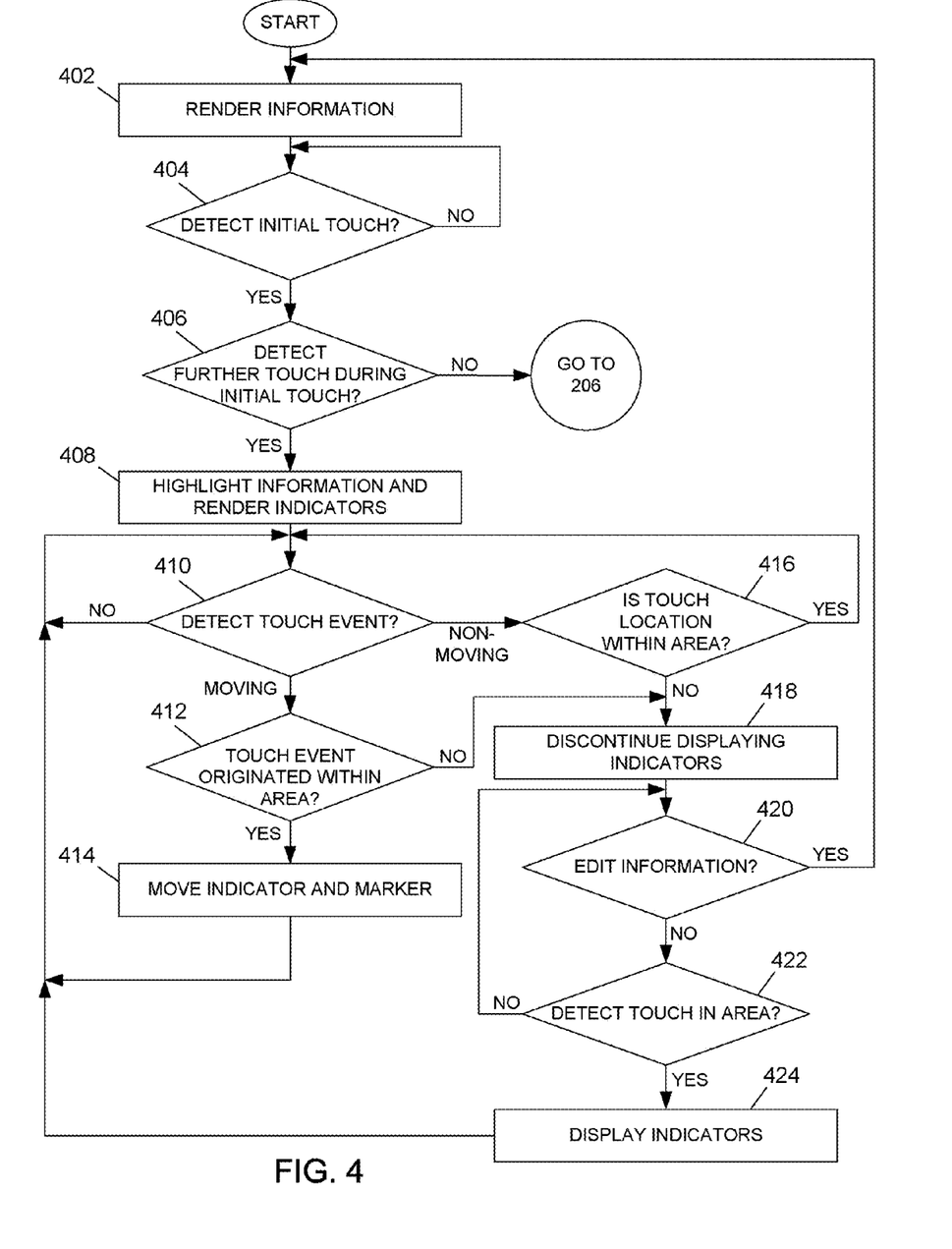
FIG. 4 is a flowchart illustrating a method of highlighting by locations on a touch-sensitive display in accordance with the present disclosure.

A flowchart illustrating a method of highlighting by locations on a touch-sensitive display 118 is shown in FIG. 4. The method may be carried out by software executed by, for example, the processor 102. Coding of software for carrying out such a method is within the scope of a person of ordinary skill in the art given the present description.

Figure 5:
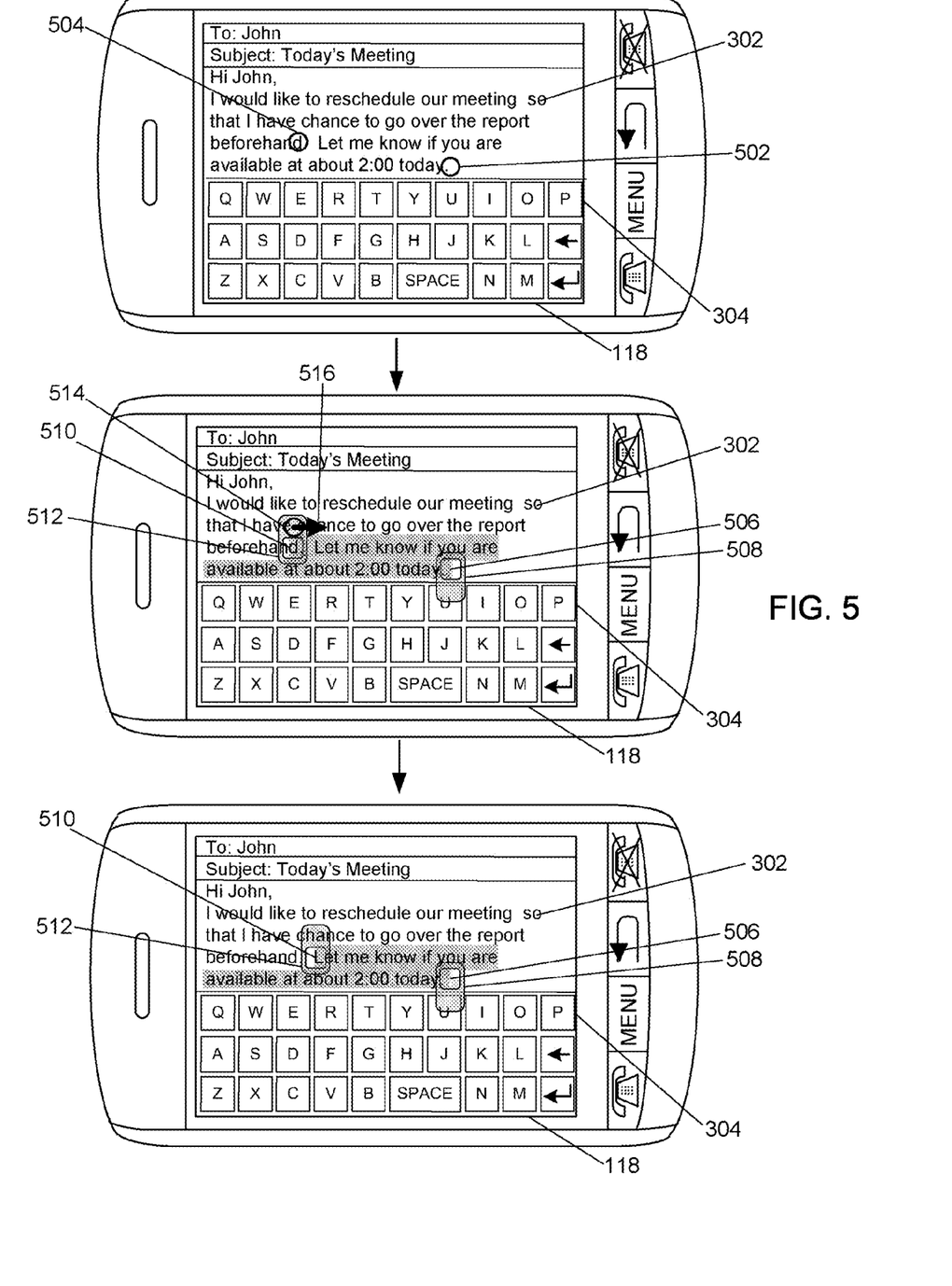
FIG. 5 illustrates examples of highlighting text on a touch-sensitive display of a portable electronic device in accordance with the present disclosure.

Information, such as text, is rendered 402 on the touch-sensitive display 118, for example, for an application such as an electronic mail, calendar, address book, web browser, or other suitable application. The rendered information may also include a plurality of keys of a keyboard, for example. When an initial touch is detected 404 at a location associated with the information, by the touch-sensitive display 118, and a further touch is detected 406 during or simultaneously with the initial touch, indicators are rendered 408, one at the initial touch location and a further at the subsequent touch location, and the information between these locations is highlighted 408. The indicators are advantageously larger in size than a single character in text, such as shown in FIG. 5, to facilitate easier handling and maneuvering by a contact member such as a finger. One indicator is associated with the earliest position in the highlighted text, i.e., the first character of the highlighted text, and the other indicator is associated with the latest position in the highlighted text, i.e., the last character of the highlighted text. The indicator associated with the earliest position in the text may advantageously be displayed with a majority of its area above the highlighted text, e.g., in an upward orientation, while the indicator associated with the latest position in the text may be advantageously displayed with a majority of its area below the highlighted text, e.g., in a downward orientation. When a moving touch event is detected 410 by the touch-sensitive display 118, a determination is made 412 as to whether the moving touch event originated within the area associated with one of the indicators. When the moving touch event originates 412 at a location within the area associated with one of the indicators, the indicator moves 414 along the information as the highlighted text is selected or deselected such that the text between the locations associated with the indicators is highlighted. Thus, when a touch that originates at a location within the area of one of the indicators moves, more or less text is highlighted as the touch moves until the touch ends, for example, when contact with the touch-sensitive display 118 ceases to be detected, when the touch-sensitive display 118 is depressed, and so forth. Both indicators may be simultaneously moved, resulting in a change of highlighted text at both ends of the highlighted text. While the text is highlighted, the information may be edited, e.g., cut, copy, paste, and so forth, at any time, after which the process continues at 402. When a non-moving touch is detected 416 that is not at a location associated with the area of one of the indicators, or when a moving touch is detected 412 that is not at a location associated with the area of one of the indicators, the touch-sensitive display 118 discontinues display 418 of the indicators. If the information is edited 420, the process continues at 402, otherwise a touch detected in an area associated with one of the indicators results in rendering of the indicators again, and the process continues at 410 When the touches do not overlap in time at 406, the process continues at 206 of FIG. 2.

Examples of highlighting text on a touch-sensitive display 118 of a portable electronic device 100 are shown in the series of illustrations of FIG. 5. Information in the form of the text 302 is rendered 402 on the touch-sensitive display 118 in fields of an email in this example. The plurality of keys of the keyboard 304 are also rendered on the touch-sensitive display 118. Touches are detected at two locations 502, 504 associated with the text by the touch-sensitive display 118, as shown in the upper illustration of FIG. 5. The touches 502, 504 at least partially overlap in time. When the touches 502, 504 begin at substantially the same time, two indicators 508, 512 are rendered at substantially the same time as shown in the middle illustration of FIG. 5. When one touch 502 begins substantially before the subsequent touch starts, a marker 506 and an associated indicator are rendered, such as shown the middle illustration of FIG. 3, and the indicator is changed to the indicator 508 in the shape and orientation of FIG. 5 when a further touch is detected during the initial touch, and another indicator 512 is rendered in association with the subsequent location within the information, as shown in the middle illustration of FIG. 5. The text between the indicators is highlighted. One indicator 512 is the earliest part of the information or character 510 of the highlighted text and the other indicator 508 is the latest part of the information or character 506 of the highlighted text. In this example, each indicator 508, 512 is generally rectangular and the associated area of the indicator extends above or below the highlighted text to facilitate touching at a location associated with the indicator 508, 512. One indicator 512 is located at the earliest part of the highlighted information and is oriented such that the majority of the second indicator 512 is located or extends above the highlighted information. The other indicator 508 is located at the latest part of the highlighted information and is oriented such that the majority of the first indicator 508 is located or extends below the highlighted information. The outer periphery of each indicator 508, 512 is shaded. Thus, the attributes of the indicator and the text facilitate viewing of the indicator and the text when the indicator is displayed. Movement of a touch that originates at a location 514 associated with the upper locator 512 is illustrated by the arrow 516 in the middle illustration of FIG. 5. The movement from the "d" in "beforehand" to the "L" in "Let" results in the highlighting of only the last sentence of the text 302, which may be edited, e.g., but cutting, copying, or pasting through a menu selection or another touch.

In the example described above with reference to FIG. 5, the second touch at least partially overlaps in time with the first touch. Optionally, a highlighting may be performed without the first and second touches overlapping in time. The portable electronic device 100 may enter a highlighting mode in which the touches do not need to overlap in time, facilitating selection with a single contact member, such as a finger or appendage. In one example, a menu selection, for highlighting information, may be selected prior to the first touch. Alternatively, a single indicator may be rendered at either end of the highlighted text. The single indicator moves along one end of the highlighted text, and a touch near the other end of the highlighted text brings up an indicator to adjust the other end of the highlighted text.

Figure 6:
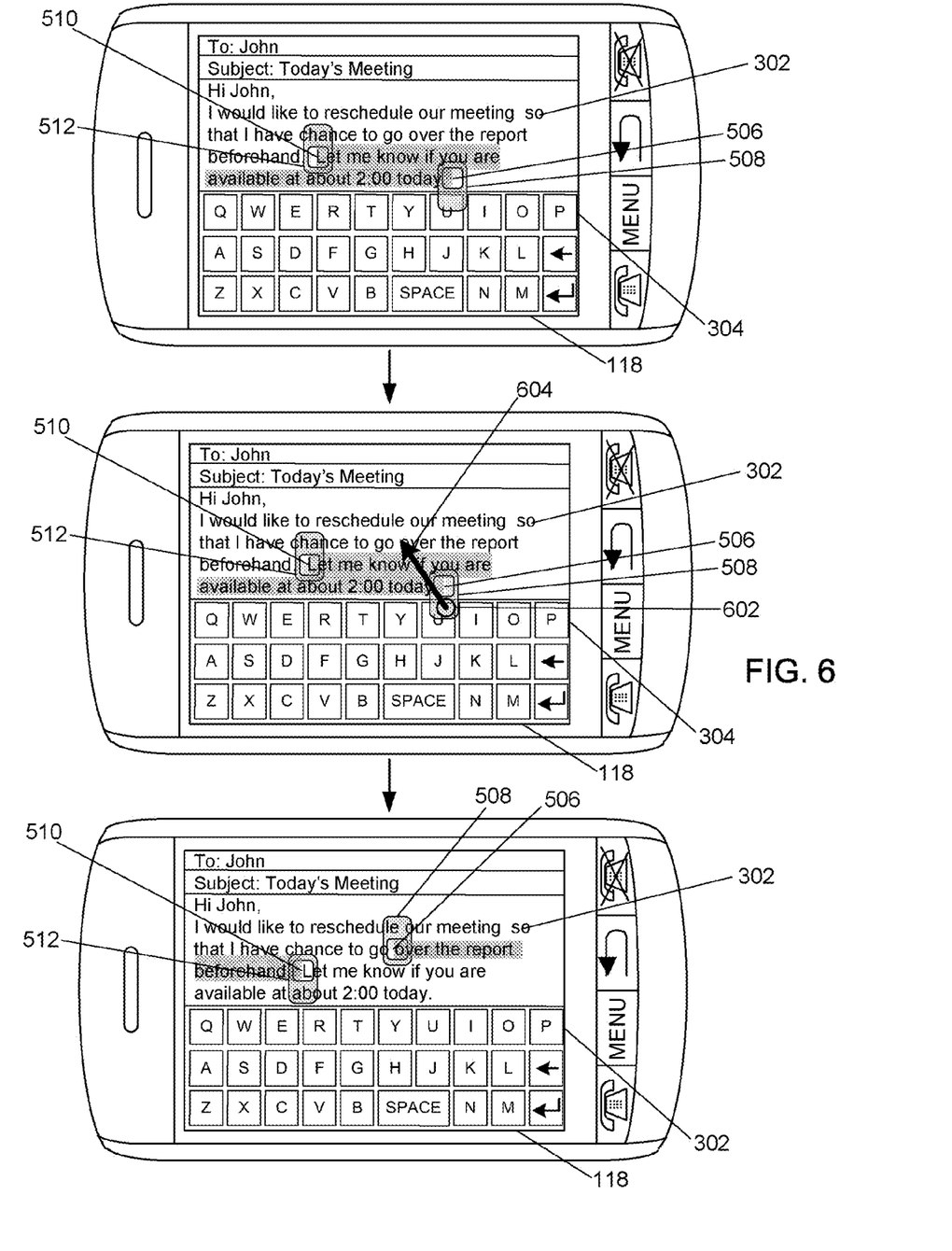
FIG. 6 illustrates examples of highlighting text on a touch-sensitive display of a portable electronic device in accordance with the present disclosure.

Examples of highlighting text on a touch-sensitive display 118 of a portable electronic device 100 are shown in the series of illustrations of FIG. 6. As in the example shown and described with reference to FIG. 5, touches that at least partially overlap in time are detected. One indicator 512 is rendered at the location of one touch at the earliest position 510 in the highlighted text and another indicator 508 is rendered at the location of the other touch at the latest position 506 within the information, as shown in the upper illustration of FIG. 6. The text between the positions is highlighted. The indicator 512 located at the earliest part of the highlighted information and is oriented such that the majority of the indicator 512 is located or extends above highlighted information. The indicator 508 located at the latest part of the highlighted information is oriented such that the majority of the first indicator 508 is located or extends below the highlighted information. A moving touch is detected that originates at a location 602 associated with the indicator 508, and movement of the touch is illustrated by the arrow 604 in the middle illustration of FIG. 6. The indicator 512 moves to the third location and the highlighting is changed to highlight the information between the indicators 508 512, taking into account the new indicator position as shown in the lower illustration of FIG. 6. In this example, the movement of one indicator 508 crosses the position in the information of the other indicator 512, and the orientations of the indicators are switched, such that the majority of the indicator 508 at the earliest highlighted text position is located above the highlighted information, and the majority of the indicator 512 at the latest highlighted text position is located below the highlighted information, as shown in the lower illustration of FIG. 6. Various different sizes and/or shapes of the indicators may be successfully utilized.

A method includes displaying information on a touch-sensitive display, detecting a touch at location associated with the information, rendering an indicator at a position within the information, detecting a moving touch associated with the indicator, and moving a cursor along the information as the indicator is moved.

A computer-readable medium has computer-readable code executable by at least one processor of a portable electronic device to perform the above method.

A portable electronic device includes a touch-sensitive display arranged to display information, and a processor operably coupled to the touch-sensitive display to detect a touch at location associated with the information, render an indicator at a position within the information, detect a moving touch associated with the indicator, and move a cursor along the information as the indicator is moved.

A method includes displaying information on a touch-sensitive display, detecting a first touch at first location associated with the information and a second touch at second location associated with the information, wherein the first touch and the second touch overlap at least partially in time, rendering a first indicator and a first marker at the first location, rendering a second indicator and a second marker at the second location, detecting a moving touch associated with the first indicator, and moving the first marker along the information as the first indicator is moved.

A computer-readable medium having computer-readable code executable by at least one processor of a portable electronic device to perform the method according to the above method A portable electronic device includes a touch-sensitive display arranged to display information, and a processor operably coupled to the touch-sensitive display to detect a first touch at first location associated with the information and a second touch at second location associated with the information, wherein the first touch and the second touch overlap at least partially in time, render a first indicator and a first marker at the first location, render a second indicator and a second marker at the second location, detect a moving touch associated with the first indicator, and move the first marker along the information as the first indicator is moved.

A method includes displaying information on a touch-sensitive display, detecting a first touch at first location associated with the information, rendering a first indicator at a first position within the information, when a second touch is detected at a second location associated with the information, rendering a second indicator at a second position and highlighting information that is displayed between the first position and the second position. A cursor or marker may be rendered at a position within the information prior to detecting the second touch. Display of the cursor or marker may be discontinued with the second indicator is rendered.

A computer-readable medium having computer-readable code executable by at least one processor of a portable electronic device to perform the method according to the above method.

A portable electronic device includes a touch-sensitive display arranged to display information, and a processor operably coupled to the touch-sensitive display to detect a first touch at first location associated with the information, render a first indicator at a first position within the information, and when a second touch is detected at a second location associated with the information, render a second indicator at a second position and highlight information that is displayed between the first position and the second position.

An indicator that is associated with a marker facilitates control of the marker location. The marker may be utilized for insertion, deletion, and/or selection of information, in other words, the marker may act as a cursor. Further, the indicators may be utilized to highlight information for cutting, copying, pasting, moving, or deleting. The indicators are associated with a larger area than the area associated with the marker. Thus, the indicators are easier to touch-select and move than the marker. Further, each indicator may be moved by touching an area of the indicator without obscuring the marker to provide fine control of the location of the marker, facilitating accurate selection, decreasing device use time and thereby decreasing power requirements during selection. The indicators provide a larger area for more easily and accurately moving a marker such as a cursor and for selecting text more accurately, resulting in easier, faster, and more accurate editing of information on a touch-sensitive display.

The present disclosure may be embodied in other specific forms without departing from its spirit or essential characteristics. The described embodiments are to be considered in all respects only as illustrative and not restrictive. The scope of the present disclosure is, therefore, indicated by the appended claims rather than by the foregoing description. All changes that come within the meaning and range of equivalency of the claims are to be embraced within their scope.

What is claimed is:

1. A method comprising:
   displaying information on a touch-sensitive display;
   detecting a first touch at a first location associated with the information;
   rendering a first indicator at a first position within the information when the first touch is detected;
   when a second touch is detected at a second location associated with the information, rendering a second indicator at a second position and highlighting information that is displayed between the first position and the second position
   wherein a majority of one of the first and second indicators is oriented above an earliest part of the highlighted information, and wherein a majority of an other of the first and second indicators is oriented below a latest part of the highlighted information; and
   detecting crossing movement of the first and second indicators, and switching orientations of the first and second indicators.

2. The method according to claim 1, comprising rendering a marker at the position within the information prior to detecting the second touch.

3. The method according to claim 1, comprising moving a marker along the information as the first indicator is moved.

4. The method according to claim 1, comprising changing the first indicator when the second indicator is rendered.

5. The method according to claim 1, comprising, when the first indicator moves to a third position in the information, highlighting the information that is displayed between the third position and the second position.

6. The method according to claim 1, comprising, when the second indicator is moved to a third position in the information, highlighting the information that is displayed between the first position and the third position.

7. A computer-readable storage medium having computer-readable code executable by at least one processor of a portable electronic device to perform the method according to claim 1.

8. The method according to claim 1, wherein the first touch and the second touch overlap at least partially in time.

9. The method according to claim 1, wherein the indicator at least partially surrounds a marker.

10. The method according to claim 1, comprising determining an applied force of the touch on the touch-sensitive display, wherein the indicator is rendered in response to determining that the applied force exceeds a threshold.

11. The method according to claim 1, comprising detecting a moving touch associated with a part of the first indicator, which part is spaced from the first location, and moving the first indicator within the information based on the moving touch.

* * * * *